H. B. FOLEY.
SAW FILING MACHINE.
APPLICATION FILED OCT. 16, 1916.
1,224,293.
Patented May 1, 1917.
3 SHEETS—SHEET 3.
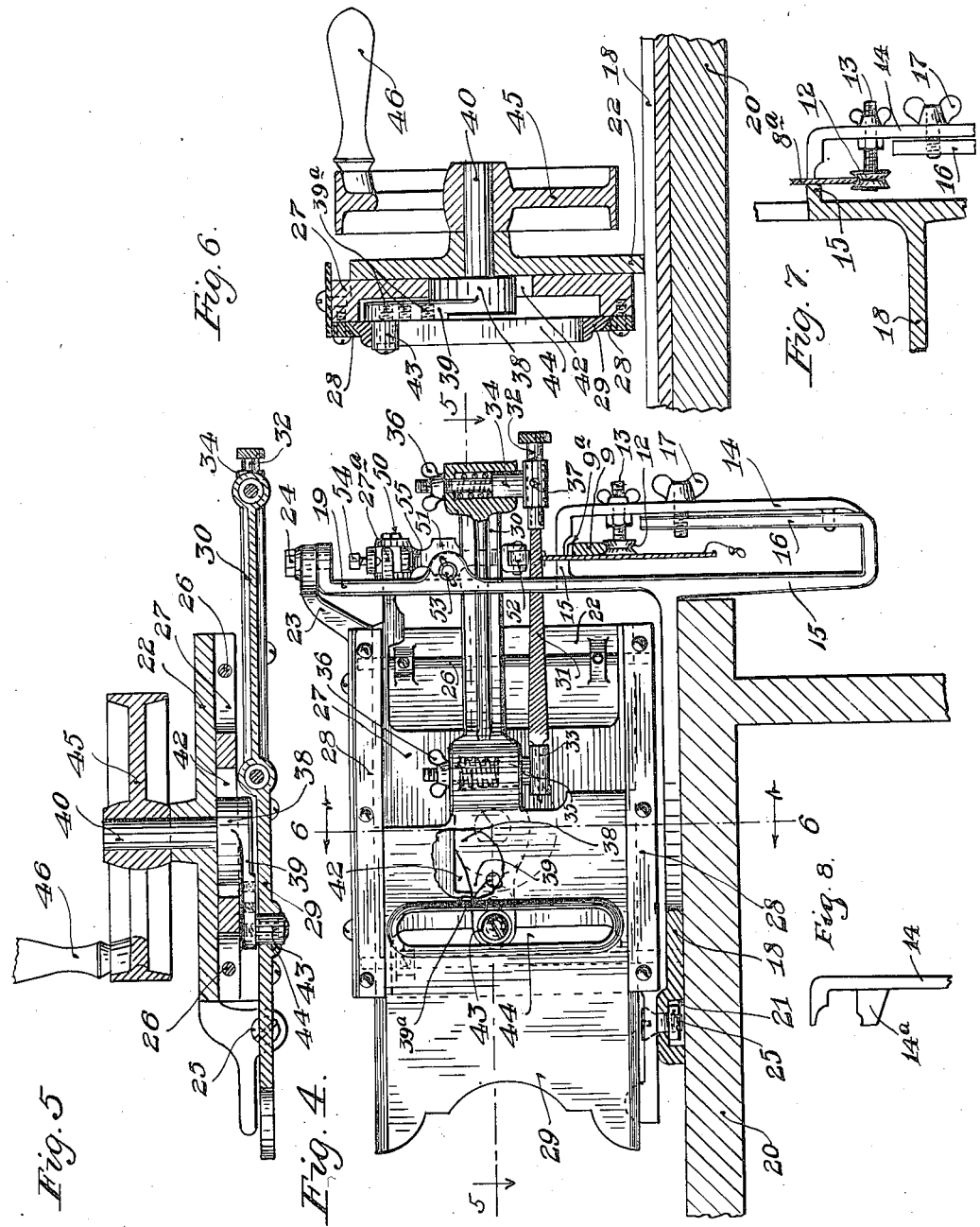
Witnesses
H. L. Opsahl.
E. C. Wells
Inventor
Hugh B. Foley
By his Attorneys
Williamson Merchant

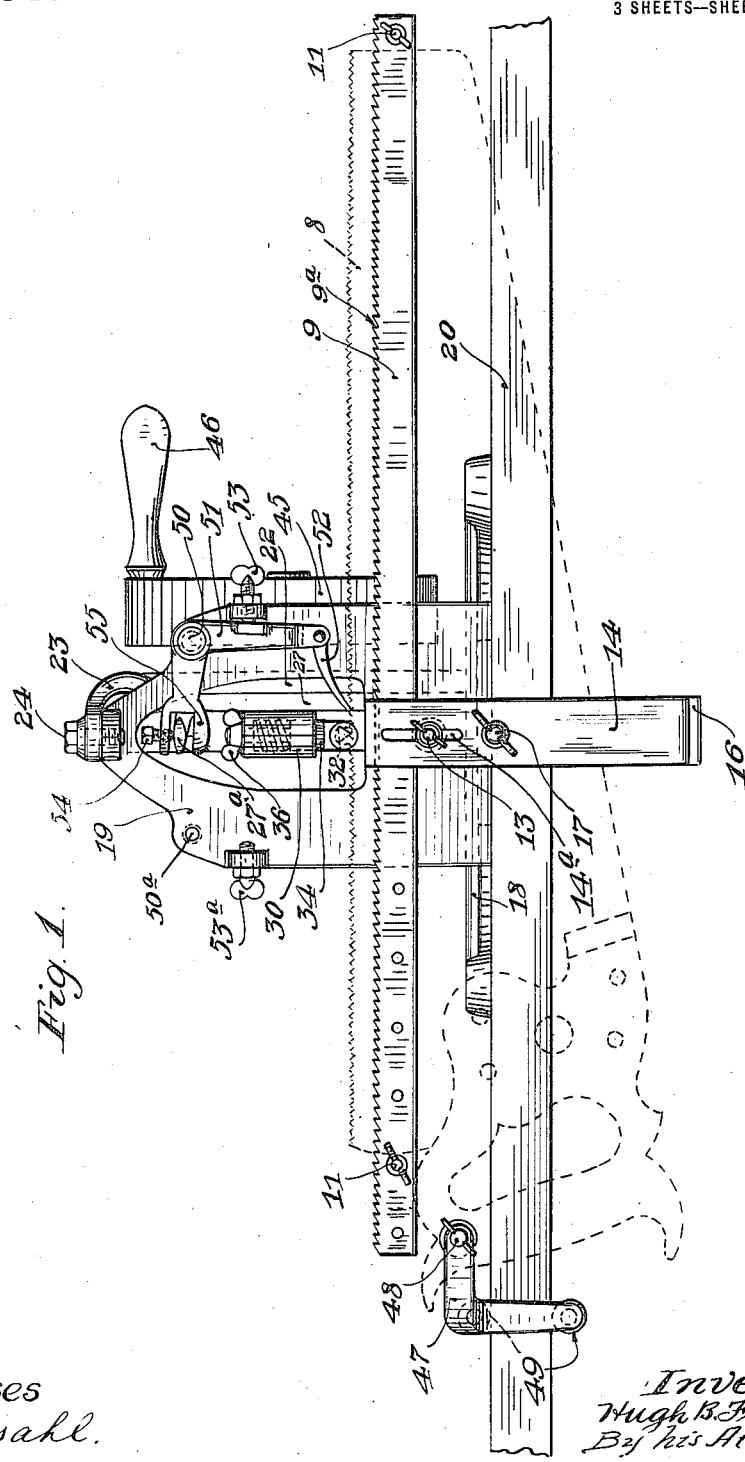

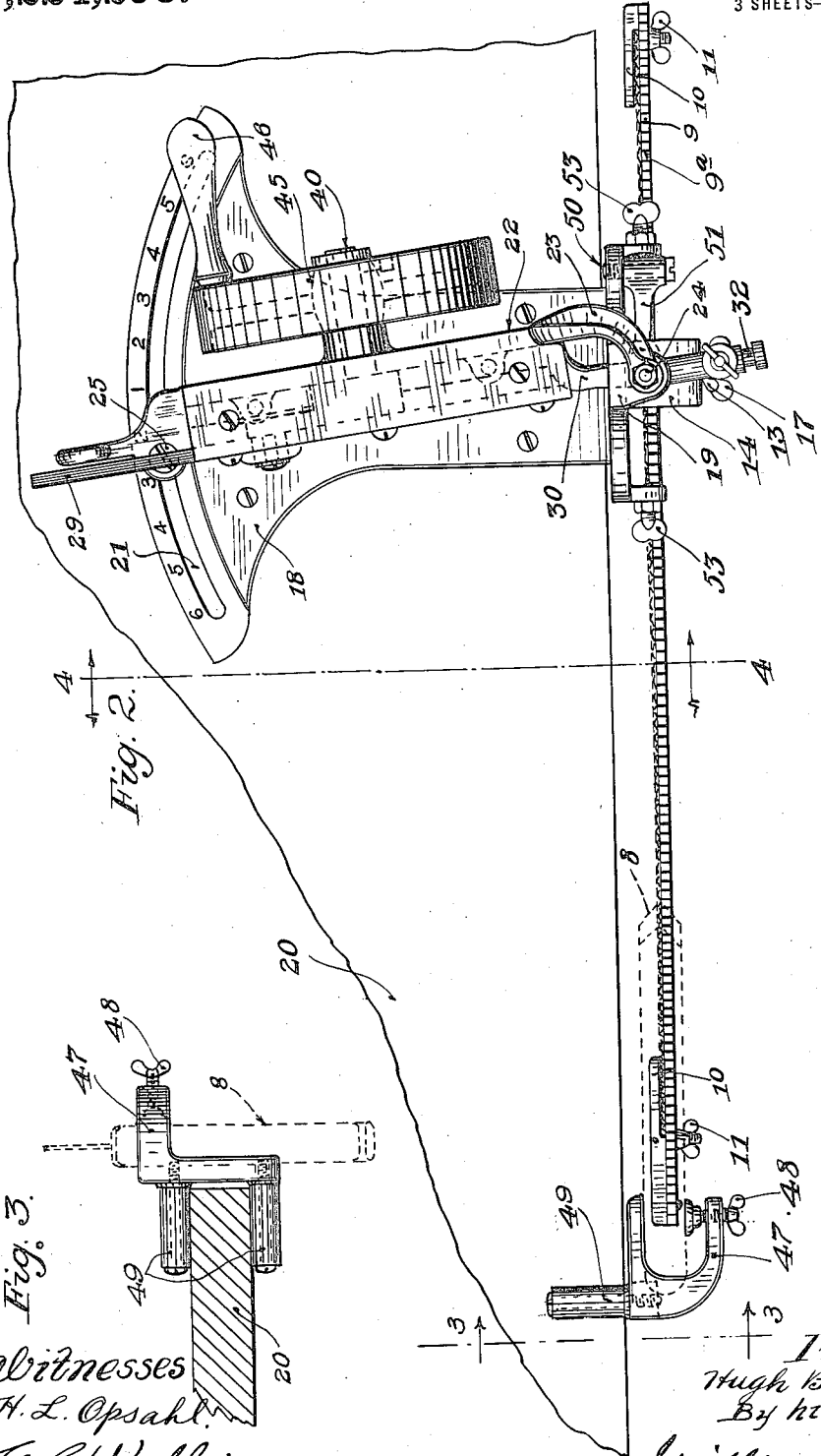

UNITED STATES PATENT OFFICE.

HUGH B. FOLEY, OF MINNEAPOLIS, MINNESOTA.

SAW-FILING MACHINE.

1,224,293.          Specification of Letters Patent.      Patented May 1, 1917.

Application filed October 16, 1916. Serial No. 125,813.

*To all whom it may concern:*

Be it known that I, HUGH B. FOLEY, a citizen of the United States, residing at Minneapolis, in the county of Hennepin and State of Minnesota, have invented certain new and useful Improvements in Saw-Filing Machines; and I do hereby declare the following to be a full, clear, and exact description of the invention, such as will enable others skilled in the art to which it appertains to make and use the same.

My invention has for its object to provide a simple and highly efficient saw filing machine especially adapted for filing hand saws, band saws or other saws having their teeth arranged on a straight line; and to such ends, generally stated, the invention consists of the novel devices and combinations of devices hereinafter described and defined in the claims.

The invention is illustrated in the accompanying drawings wherein like characters indicate like parts throughout the several views.

Referring to the drawings:

Figure 1 is a view in side elevation showing the improved saw filing machine supported on a table and holding a hand saw, the latter being indicated by dotted lines;

Fig. 2 is a plan view of the machine;

Fig. 3 is a section on the line 3—3 of Fig. 2;

Fig. 4 is a vertical section taken approximately on the line 4—4 of Fig. 2;

Fig. 5 is a horizontal section taken on the line 5—5 of Fig. 4;

Fig. 6 is a section taken approximately on the line 6—6 of Fig. 4 but with the cross head moved forward;

Fig. 7 is a fragmentary view partly in vertical section and partly in elevation, illustrating a different adjustment of the vise from that shown in the other views, wherein the vise is arranged to hold a band saw; and Fig. 8 is a detail showing a slight modification of the saw vise.

In the operation of sharpening a hand saw, or other saw having a back not parallel to its toothed edge, a straight edge or guide bar is clamped thereto parallel to its toothed edge. In the drawings, the said saw is indicated by the numeral 8 and the said clamping bar is indicated by the numeral 9, and the latter, at its ends, is clamped to the ends of the saw blade by suitable clamping plates 10 and coöperating nut-equipped bolts 11. The toothed upper edge of the saw blade is passed between the jaws of a loosely set vise, and the lower edge of the guide bar 9 is run on a grooved guide roller 12 mounted on the inner end of a threaded supporting rod 13 that is adjustably clamped by coöperating nuts, to the outer jaw 14 of the yoke-like vise, the inner jaw of which is indicated by the numeral 15. The outer jaw 14 of the said vise is preferably made as a normally loose member adjustably attached to an arm 16 of the said vise by means of a screw 17. The jaws of the vise closely engage the saw blade, but not under sufficient friction to prevent easy movement of the saw blade. The vise is provided with an extended flat base plate 18 and an upright bearing column 19. The said plate 18 is rigidly secured by screws, or otherwise, to a table or other suitable support 20, and at its inner edge, it is formed with a segmental groove or channel 21 that extends on the arc of a circle. Usually an ordinary three-sided file will be used for sharpening the teeth of the saw and this is carried and given a compound endwise and up and down movement by a combined crosshead, which, in turn, is supported by a crosshead guide that is mounted for angular adjustments in respect to the saw. The crosshead guide, as shown, is in the form of an upright plate 22 provided at the upper portion of its front end with an arm 23 that is pivotally attached at 24 to the upper portion of the bearing post 19. The segmental slot 21 of the bed plate 18 extends concentric to the projected axis of the pivot 24, and the rear lower portion of the said bearing plate 22 is adjustably connected therewith by a nut-equipped screw 25. Here it may be noted that the slot 21 is graduated or marked in both ways from its center with numerals or other devices that indicate angles or other relative positions of the bearing plate 22 in opposite directions from a perpendicular to the face of the saw. This is done for an important purpose which will presently appear.

Laterally spaced vertical guide rods 26 are rigidly secured to lugs on one face of the bearing plate 22 and on these rods is mounted a plate-like so-called primary crosshead 27. This primary crosshead 27, at its upper and lower edges, has horizontal guides 28 in which the upper and lower edges of a plate-like so-called secondary crosshead 29 is mounted for horizontal movements, or for movements at a right angle to the direction in which the primary crosshead is mounted. The secondary crosshead 29, has a horizontally projected arm 30 that indirectly carries the file 31. The angular point of this file fits a correspondingly formed seat in one end of a small holding sleeve 32, while the stem of the file rotatably fits the sleeve 33. The sleeve 32 is rotatably mounted in the head of an outwardly spring-pressed stem 34, while the sleeve 33 is rigidly secured to the head of a similar outwardly spring-pressed stem 35. The said stems 34 and 35 are mounted in suitable seats formed in the arm 30, and their reduced threaded ends are provided with thumb nuts 36, by means of which the two stems 34 and 35 may be adjusted endwise to properly level or aline the file for action on the saw teeth. By rotation of the sleeve 32, the file can be set with its edges at the proper inclination for action on the saw teeth, and then the said sleeve is adapted to be clamped in a set position by a lock screw 37 (see Fig. 4).

The complex reciprocating movements are imparted to the primary and secondary crossheads by a compound crank shown as made up of an eccentric hub 38 and a crank arm 39, both secured to a short shaft 40 journaled in the bearing plate 22. The eccentric hub 38 works in a large notch or opening 42 formed in the primary crosshead 27. The upper edge of this notch 42 is straight and horizontal or parallel to the line of movement of the secondary crosshead and the eccentric 38 operates thereon to lift the said primary crosshead causing the latter, of course, to carry the secondary crosshead with it. The crank arm 39 has a roller-equipped stud 43 that works in a vertical slot 44 formed in the secondary crosshead plate 29. At its projecting end, the shaft 40 has an operating crank in the form of a small fly wheel 45 equipped with a crank handle 46.

For guiding the relatively heavy handle-equipped end of the saw, a wheel-equipped traveler is attached to the latter and arranged to run on the adjacent edge of the table or support 20. This traveler is in the form of a bifurcated clamping head 47 having a clamping screw 48 adapting it to be clamped to the handle of the saw and having vertically spaced roller-equipped studs 49 arranged to run, one on the upper and one below the lower surface of the table top. This clamp should, of course, be so applied to the saw blade that the toothed edge thereof will be parallel to the edge of the table.

For feeding the saw automatically, I provide an automatic feed mechanism which is arranged either to operate directly on the teeth of the saw, or to operate upon teeth formed on the clamping bar 9. This feed device is preferably constructed as follows:

Pivoted to a stud 50 on the column 19 is a bell crank 51, which, at its lower end, carries a feed dog 52 that is engageable, either with the saw teeth or with the teeth 9$^a$ on the upper edge of the clamping bar 9. The upper arm of this bell crank is forked and embraces a laterally projecting tappet or actuating finger 27$^a$ (see Figs. 1 and 4) that projects from the upper front edge portion of the vertically movable primary crosshead 27. A stop screw 53 applied to a lock on the column 19 limits the movement of the lower arm of the bell crank toward the right in respect to Fig. 1. The upper prong of the pronged arm of said bell crank is provided with a tappet screw 54 (see Fig. 1) that is engaged by a tappet 27$^a$ on the upward movement of the primary crosshead. The pronged arms of said bell crank, as shown, is weighted at 55 so that the feed dog 52 will be normally retracted or moved toward the right.

The operation of the machine, summarized, is substantially as follows:

When the bearing plate 22 is set at a right angle to the teeth of the saw, or at the zero mark on the scale of the graduated slot 21, the file will cut the teeth at a right angle to the face of the saw, but when the said bearing plate is set on one side or the other of the right angle or zero position, the file will cut the teeth at an angle, and this angle, as is evident, may be varied, at will. If the alternated teeth of the saw are to be cut reversely oblique, then the feed device will be set so that it will feed two teeth at each feed movement and alternate teeth will then be filed under the first operation and the intermediate teeth filed under a second operation after having changed the position of the bearing plate 22 to the reverse angle indicated by the reverse graduations on the scale.

Under rotation of the crank wheel 45 and compound crank 38—39, the compound crosshead will be given a compound reciprocating motion, as before stated, and the file, will be given the following movement, towit; while the secondary crosshead is lowered, the file will be moved endwise over the saw teeth producing the cutting action, and then, as the file reaches the limit of its cutting movement, the primary crosshead will be slightly raised by the eccentric 38 carrying the secondary crosshead and file with it and raising the file out of contact with the saw teeth, so that under return movement of the file, it will be carried above the saw teeth and then again lowered to its operative position at the limit of its return stroke. The two ends of the file, as is evident, are supported for independent adjustments so that the file, when desired, may be given a slight inclination, or otherwise positioned so that it will have the desired progressive filing action under forward or outward movement.

At the limit of the upward movement of the primary crosshead, its tappet $27^a$ strikes the screw 54 and, operating through the bell crank 51, impels the feed dog 52 forward, causing the same, acting on the teeth of the saw, to impel the saw forward, either two teeth or one tooth, according to the adjustment. When the said primary crosshead is lowered near the limit of the return movement of the file, the feed dog 52 will be moved backward into engagement with another tooth of the saw blade, and hence, made ready for the next feeding action.

The feed device may be adjusted for teeth varying in number per inch, or for the feeding of one tooth or more at each feed movement, by adjustments of the screws 53 and 54. Adjustments of the screw 53 will determine the return or backward movement of the feed dog 52, and adjustments of the screw 54 will determine the limit of forward movement of the said feed dog. Furthermore, rotary adjustments of the file to vary the inclination of its cutting surfaces will require adjustments of the screw 54 to compensate for lateral swinging movement of the lower edge of the file.

It is highly important to note that the axis of the pivot 24 is in vertical line with the point where the cutting edge of the file 31 intersects the plane of the saw 8. This prevents the operative portion of the file from being moved longitudinally of the saw when the bearing plate 22, and hence the file, are adjusted from one angle to another in respect to the plane of the saw.

The file is yieldingly pressed downward at both ends, and this is highly important for two reasons, to-wit, it permits the file to adapt itself to varying elevation in the teeth of the saw, and in the second place, it yieldingly holds the file to its work and produces a sort of automatic feeding action, which prevents excessive cutting by the file.

Also, the file, at both ends, may be vertically adjusted, and hence, not only set in the proper position in respect to a horizontal, but properly adjusted bodily in a vertical direction.

The feed dog, it is also highly important to note, on its operative stroke, moves substantially into contact with the file so that it will feed the very last tooth of the saw to the file.

The stroke of the file support may be varied to adapt the device to files of different length, by adjusting the roller-equipped stud 43 into one or the other of several perforations $39^a$ with which the crank arm 39 is provided (see particularly Fig. 4).

In sharpening band saws without turning the same "inside out" it will frequently be necessary to feed the saw from the left toward the right, or from the right toward the left. This action is arranged for by providing the pedestal 19 with a threaded seat $50^a$ to which the stud 50 may be applied, and by providing said pedestal with a stop screw $53^a$, which is a reverse position to the stop screw 53. A dog-equipped bell crank 51 may then be reversed simply by turning it over from the right to the left hand side and applying the same as above indicated and it will then operate just as in the arrangement previously and more fully described, except that it will move the saw from the left toward the right.

The saw filing device described, when the feed dog operates on the ratchet teeth $9^a$ of the bar 9, is adapted to cut new teeth in a blank saw blade, but the said operation may be also used for sharpening the dull teeth of the saw where it is desired to make accurate, or correct spacing of the teeth.

In adapting the machine for filing band saws, the blade $8^a$ of the said saw is passed between the jaws of the vise, and the guide roller 12 is then adjusted, as shown in Fig. 1, so that the back of said blade will run in the groove thereof. Here it will be noted that the threaded stud 13 is not only adjusted farther inward than in Fig. 4, but is also raised, the jaw 14 having a slot $14^a$ which permits the latter noted adjustment of the screw.

Where the vise is to be used only for sharpening hand saws, the threaded rod 13 and roller 12 may be dispensed with and the loose arms 14 of the vise is formed with one or more guide lugs $14^a$ (see Fig. 8), upon which the saw clamping bar 9 may be placed and moved.

What I claim is:

1. In a saw filing machine, a crosshead support having front vertical guides, a primary crosshead movable vertically in the guides of said support, a secondary crosshead mounted for straight line horizontal movements on said primary crosshead, and provided with a file holder, and a compound crank operative directly on said primary and secondary crossheads to alternately impart the respective straight line movements thereto.

2. In a saw filing machine, a saw blade holder, of a crosshead support having an angular movement in respect to the plane of the saw blade held by said holder, a crosshead device mounted on said crosshead support and provided with a file holder, and a power device mounted on and adjustable with said crosshead support and having connections to said crosshead for imparting thereto, and to the file holder, saw filing movements.

3. In a saw filing machine, the combination with a saw blade holder, of a crosshead support pivotally connected thereto by a pivot, the axis of which is in the extended plane of a saw blade held by said holder, a crosshead device mounted on said crosshead support and provided with a file holder arranged to hold a file for engagement with the saw blade at a point where the projected axis of the above noted pivot of said crosshead support intersects the saw blade, and means for imparting saw filing movements to said crosshead.

4. In a saw filing machine, a saw blade holder, a crosshead support having an angular movement in respect to the plane of the saw blade held by said holder, a primary crosshead mounted for vertical movements on said crosshead support, a secondary crosshead mounted for horizontal movements on said primary crosshead, and provided with a file holder, and a power device mounted on and adjustable with said crosshead support and having connections for imparting the respective movements to said primary and secondary crossheads.

5. In a saw filing machine, the combination with a saw blade holder, of a crosshead support pivotally connected thereto by a pivot, the axis of which is in the extended plane of a saw blade held by said holder, a crosshead device mounted on said crosshead support and provided with a file holder arranged to hold a file for engagement with the saw blade at a point where the projected axis of the above noted pivot of said crosshead support intersects the saw blade, and a power device mounted on and adjustable with said crosshead support and having connections for imparting the saw filing movements to said crosshead.

6. In a saw filing machine, the combination with means for holding and guiding a saw, of means for imparting compound endwise and vertical reciprocating movements to the file, and a reversible saw feeding device applicable to feed the saw to the file by a step-by-step movement in either of two opposite directions.

7. In a saw filing machine, a crosshead support, a primary crosshead movable vertically thereon, a secondary crosshead movable horizontally on said primary crosshead and provided with a file holder, means for imparting complex reciprocating movements to said crossheads, said crosshead support having an angular adjustment in respect to the blade of the saw, on a pivot, the axis of which is alined with the point of intersection of the cutting edge of the file with the plane of the saw.

8. In a saw filing machine, a crosshead support, a primary crosshead movable vertically thereon, a secondary crosshead movable horizontally on said primary crosshead and provided with file holding means that is vertically adjustable.

9. In a saw filing machine, a crosshead support, a primary crosshead movable vertically thereon, a secondary crosshead movable horizontally on said primary crosshead and provided with file holding means that is vertically adjustable, and spring devices re-acting against said secondary crosshead and said two file holding devices, and yieldingly pressing the same downward.

10. In a saw filing machine, the combination with a saw blade holder permitting traveling movement of the blade, of a ratchet-toothed clamping bar with means for clamping the same to the saw blade, a crosshead having a file holder and arranged to move the file transversely of the saw blade, a power device having connections for imparting saw filing movements to said crosshead, and saw blade feeding means driven by said power device with a properly timed action, and having a dog operative on the ratchet teeth of said clamping bar.

11. In a saw filing machine, the combination with a saw blade holder holding a saw while permitting traveling movements thereof, of means for guiding the saw, including a clamping bar with means for clamping the same to the saw blade, a guide on said blade holder for guiding said clamping bar, a crosshead having a file holder and mounted to move said file transversely of the saw blade, a power device with connections for imparting saw filing movements to said crosshead, and a saw feeding device operated with a properly timed action from said power device.

In testimony whereof I affix my signature in presence of two witnesses.

HUGH B. FOLEY.

Witnesses:
CLARA DEMAREST,
B. G. WHEELER.